C. V. Littlepage,
Water Wheel,
No. 22,880.    Patented Feb. 8, 1859.
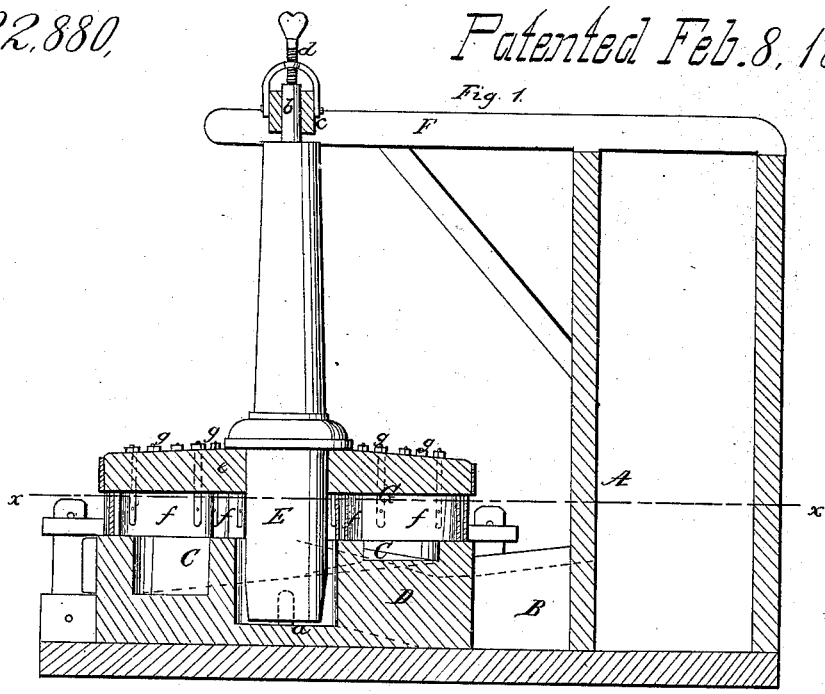
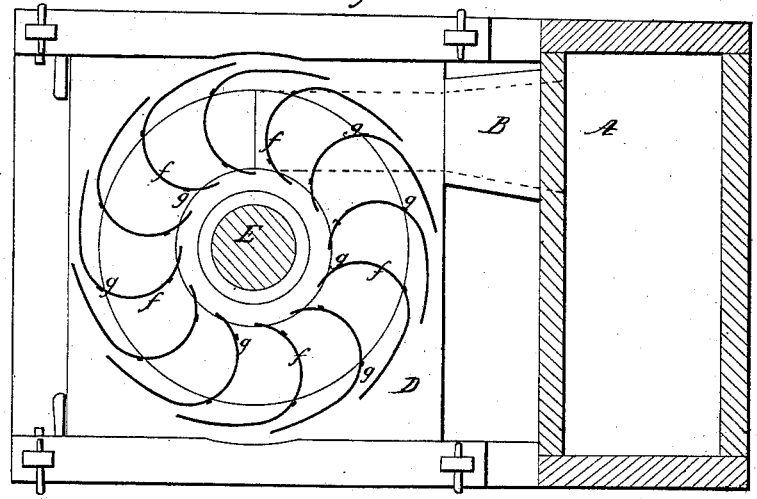
Witnesses:
M. A. Taylor
G. E. Robinson
Inventor:
C. V. Littlepage

UNITED STATES PATENT OFFICE.

C. V. LITTLEPAGE, OF AUSTIN, TEXAS.

IMPROVED WATER-WHEEL.

Specification forming part of Letters Patent No. 22,880, dated February 8, 1859.

*To all whom it may concern:*

Be it known that I, C. V. LITLLEPAGE, of Austin, in the county of Travis and State of Texas, have invented a new and Improved Water-Wheel; and I do hereby declare that the following is a full, clear, and exact description of the same, reference being had to the annexed drawings, making a part of this specification, in which—

Figure 1 is a vertical central section of my invention. Fig. 2 is a horizontal section of the same, taken in the line $x\,x$, Fig. 1.

Similar letters of reference indicate corresponding parts in the two figures.

This invention relates to an improvement in horizontal water-wheels; and it consists in having the wheel provided with curved buckets and fitted or placed over a spiral water-passage, into which the water passes from the penstock and acts upon the bucket as it passes through said passage, the water being discharged at the outer ends of the buckets above the spiral water-passage.

The object of the invention is to relieve the step or lower bearing of the wheel of the weight of the wheel and shaft and the consequent friction attending the working of the same; also to apply the water to the wheel in such a manner as to obtain a large amount of power from a given supply or volume.

To enable those skilled in the art to fully understand and construct my invention, I will proceed to describe it.

A represents a penstock, and B is a chute which communicates at one end with the lower part of the penstock A and at the other end with a spiral passage C, formed in a suitable bed or block D, said passage gradually diminishing in depth from its junction with the chute B to its opposite end, as shown clearly in Fig. 1, the water-passage extending around the bed or block one turn.

E is a vertical shaft, the lower end of which is stepped in the block D at its center, as shown at $a$. The upper end of the shaft has a journal $b$ formed on it, said journal being placed in a bearing $c$ in a framing F, and having a set-screw $d$ bearing against its upper end, as shown clearly in Fig. 1.

On the shaft E the wheel G is placed. This wheel is formed of a circular block $e$, to the under surface of which the buckets $f$ are attached by means of bolts $g$, or by any proper means. The buckets $f$ are formed of plate-iron of any proper thickness proportionate to the size of the wheel. The buckets are of curved form, the shape being shown clearly in Fig. 2, and their lower edges work directly over the upper surface of the block D, as shown clearly in Fig. 1.

The water passes from the penstock A through the chute B into the spiral passage C and acts against the buckets $f$, all the buckets being acted upon simultaneously, the water passing upward under the pressure of the water in the penstock, and by this upward pressure relieving the lower bearing $a$ of the shaft E of the weight of the wheel, the gravity of the wheel and the pressure of the water being nearly counterpoised. The water is discharged from the outer ends of the buckets, and the screw $d$ at the upper end of the shaft is so regulated or adjusted as to prevent the wheel being raised sufficiently to allow the escape of water between the lower edges of the buckets $f$ and the top surface of the bed or block D. The water acts equally upon all the buckets $f$ and has a free discharge from the wheel, the water acting upon the buckets at first by impact and then acting as it leaves the buckets by reciprocal reaction without producing any drag upon the wheel.

The within-described invention has been practically tested and has been found to answer remarkably well. It may be constructed at a very reasonable cost and applied in all cases where any of the ordinary horizontal wheels may be advantageously employed.

I do not claim separately the curved buckets $f$; but,

Having thus described my invention, what I do claim as new, and desire to secure by Letters Patent, is—

The wheel G, provided with curved buckets $f$ and attached to the shaft E, stepped in the block D, and otherwise arranged as shown, in connection with the spiral water-passage C in the block or bed D, the whole being arranged to operate as and for the purpose set forth.

C. V. LITTLEPAGE.

Witnesses:
M. A. TAYLOR,
G. E. ROBINSON.